US012489630B2

(12) United States Patent
Yang

(10) Patent No.: US 12,489,630 B2
(45) Date of Patent: Dec. 2, 2025

(54) MULTI-FACTOR AUTHENTICATION METHOD AND SYSTEM FOR WEB3 SERVICES

(71) Applicant: TELEFONICA INNOVACION DIGITAL, S.L.U., Madrid (ES)

(72) Inventor: Xiaoyuan Yang, Madrid (ES)

(73) Assignee: TELEFONICA INNOVACION DIGITAL, S.L.U., Madrid (ES)

( * ) Notice: Subject to any disclaimer, the term of this patent is extended or adjusted under 35 U.S.C. 154(b) by 129 days.

(21) Appl. No.: 18/514,414

(22) Filed: Nov. 20, 2023

(65) Prior Publication Data

US 2024/0195625 A1 Jun. 13, 2024

(30) Foreign Application Priority Data

Nov. 18, 2022 (EP) .................................... 22383115

(51) Int. Cl.
*H04L 29/06* (2006.01)
*H04L 9/00* (2022.01)
*H04L 9/30* (2006.01)
*H04L 9/32* (2006.01)

(52) U.S. Cl.
CPC .............. *H04L 9/3213* (2013.01); *H04L 9/30* (2013.01); *H04L 9/50* (2022.05)

(58) Field of Classification Search
CPC ........... H04L 9/3213; H04L 9/50; H04L 9/30
See application file for complete search history.

(56) References Cited

U.S. PATENT DOCUMENTS

| 11,025,431 | B2 | 6/2021 | Sharma et al. |
| 11,257,078 | B2 | 2/2022 | Mittal et al. |
| 2020/0213128 | A1 | 7/2020 | Sharma et al. |
| 2020/0394651 | A1* | 12/2020 | Kreder, III ............. G06Q 20/22 |
| 2022/0343319 | A1 | 10/2022 | Murao et al. |
| 2023/0376941 | A1* | 11/2023 | Jin .......................... H04L 9/083 |

FOREIGN PATENT DOCUMENTS

CN 111027035 B 4/2022

OTHER PUBLICATIONS

Zachary Diebold, "Self-Sovereign Identity using Smart Contracts on the Ethereum Blockchain", Master in Computer Science, May 1, 2017, p. 1-76, University of Dublin, Trinity College.

* cited by examiner

*Primary Examiner* — Evans Desrosiers
(74) *Attorney, Agent, or Firm* — Hayes Soloway PC

(57) ABSTRACT

A method and system for multi-factor authenticating users in Web3 services includes a multi-factor authentication (e.g., 2FA) provider configured to validate that an end-user owns a public key in a blockchain based on a cryptocurrency or a NFT transference, the public key used as a first factor for the authentication. The authentication provider interacts with a smart contract to perform the multi-factor authentication in an operation in a smart contract by using off-chain data as the other factor(s) required for the multi-factor authentication. The off-chain data are received in a user terminal, e.g., a smartphone via SMS or a mobile application, associated with the account created in the authentication provider. The authentication result is read by each node executing the smart contract and, when a consensus is reached among nodes, a new block representing the result is generated in the blockchain.

9 Claims, 3 Drawing Sheets

MULTI-FACTOR AUTHENTICATION METHOD AND SYSTEM FOR WEB3 SERVICES

CROSS-REFERENCE TO RELATED APPLICATIONS AND PRIORITY

This patent application claims priority from European Patent Application No. 22383115.7 filed Nov. 18, 2022. This patent application is herein incorporated by reference in its entirety.

TECHNICAL FIELD

The present invention relates generally to computing systems and Internet, specifically, has its application within the blockchain networks and Web3 technologies.

More particularly, the present invention relates to a method and system for authenticating end-users in Web3 through more than one authentication factor.

BACKGROUND OF THE INVENTION

Web3 is the new distributed technology that can change how Internet will work in next decades. Blockchain is the core element of any web3 infrastructure. It provides a decentralized immutable database for smart contracts where different applications can be created, such as crypto coins, non-fungible tokens (NFT) or decentralized autonomous organization (DAO). Multiple nodes run smart contracts in fully decentralized way and reaches a consensus about a new state for the blockchain.

Consensus in smart contract requires multiple conditions. First, all nodes share a common language about how a smart contract should be created and understood. Second, all input information that the smart contract needs to compute the new state should be available and common in all nodes during the execution. This second requirement implies that any input information could not be acquired from any dynamic sources. For instance, a smart contract cannot read an input data from a temperature sensor, because temperature may change from one read to another.

General speaking, smart contracts cannot interact with external application programming interfaces (APIs) to retrieve real world data. To solve this problem, oracle systems (such as Chainlink) are created. In order to use oracle, the logic of a smart contract has to be splitted in different steps. First, the smart contract requests a data from real world to an oracle. The oracle computes the data and write it into the blockchain creating a new state. The smart contract can then read the data and performs the consensus process.

Since smart contracts need to be executed multiple nodes for consensus, all data in blockchain should be publicly accessible. The identify of user in web3 is represented by a public key. All objects/data related with a user are associated to the public key without revering the real user. For instance, name of user o any other personal data should never be stored in the blockchain because they will be publicly accessible to anyone.

A public key is always associated with a private key. Any operation that requires authorization from the user needs to interact with a specialized software (called Wallet) that performs a cryptographic signature process that can only success if appropriate private key is provided. The private key cannot be recovered in any form if it is lost. A collateral consequence of this is the fact that the public key cannot be invalidated if you lose the private key.

Key invalidation and key recovery are very common processes in the web2. If you lose a password (key), you just need to start the password recovery process that normally means introducing a new password in a magic link that you got from your email. Same process can be used to invalidate a password o key.

In order to increase key based security, two-factor authentication (2FA) is well adopted in web2 services. Services such as Google, Facebook, or Office360 from Microsoft use 2FA daily to protect end-user identities. 2FA is a security layer that make sure that users trying to access an online service are who they say they are. Instead of granting immediately access to the data after checking the key, users will be asked to provide another information that only the real user knows (PIN, password o answer to a secret question), has (a credit card, a smart-phone or a hardware token) or is (fingerprint, iris or voice print). Multiples implementations for 2FA do exist in web2: some of them requires end-users to download an application, others use dedicated hardware for 2FA, but the most popular is, however, the usage of telephone number as 2FA. Specifically, whenever a service requires a 2FA from user, it sends out a random number to the telephone as form of SMS and end-users are then be asked to introduce back the received number in the login page.

Current 2FA mechanisms cannot be adopted by Web3 because any secret information should be publicly available in the blockchain. If we want to check if a user really knows the answer to a secret question in the smart contract, the answer should be in the blockchain so the smart contract can read it.

U.S. Ser. No. 11/025,431B2 proposes to use a second wallet in a sidechain to perform 2FA. Before performing the transaction in the main chain, end-user need to post a token in the sidechain using the second wallet. The main chain is configured to check the existence of the token before proceeding the operation. The usage of sidechain provides a full distributed web3 solution. Second wallet is publicly trackable by looking the origin address of the token in the sidechain.

In U.S. Ser. No. 11/257,078B2, the blockchain is used as 2FA for bank transactions. In this case, the proposed system tries to solve the fact that 2FA based on mobile phones may fails when end-user is out of coverage of the cellular network. By requiring end-users to store one-time password in the blockchain, banking authorities can use public blockchain as 2FA, instead of the mobile phone.

Therefore, there is a need of allowing two-factor authentication in Web3.

SUMMARY OF THE INVENTION

The problems found in prior art techniques are generally solved or circumvented, and technical advantages are generally achieved, by the disclosed embodiments which provide multi-factor authentication (e.g., 2FA) to blockchain networks and Web3 technology.

An aspect of the present invention refers to a method of multi-factor authentication for Web3 services which comprises the following steps:
  creating an account in a multi-factor authentication (e.g., 2FA) provider by an end-user through the access to a multi-factor authentication provider portal of the authentication provider, the multi-factor authentication provider being configured to:

validate that the end-user owns a public key in a blockchain which identifies the end-user in Web3 (e.g., an identifier of a user's wallet);

associate the account, created by the user through the multi-factor authentication provider portal, with an identifier of a user terminal (e.g., a smartphone, a wearable programmable device such as a smartwatch, a smart speaker, an intelligent assistant, a tablet, a personal computer, a laptop, a smart TV set, etc.) capable of receiving off-chain data (e.g., in a SMS or via an app) used for multi-factor authentication and the data coming from outside of the blockchain;

authenticate the end-user in the multi-factor authentication provider portal by using the identifier (e.g., a PIN or phone number, etc.) of the user terminal;

wherein, to validate that the end-user owns the public key, the multi-factor authentication provider is associated with the public key, used as a first factor of the multi-factor authentication, and the multi-factor authentication provider interacts with a smart contract to perform the multi-factor authentication (e.g., 2FA) in an operation in the smart contract by using the off-chain data as the, one or more factors, required (the second factor in 2FA) for the multi-factor authentication.

Another aspect of the present invention refers to a system implementing the multi-factor authentication method in Web3 described above.

The invention is defined by the independent claims. The dependent claims define advantageous embodiments.

The system in accordance with the above-described aspects of the invention has a number of advantages with respect to the aforementioned prior art, which can be summarized as follows:

While U.S. Ser. No. 11/257,078B2 proposes to use blockchain technology to implement 2FA in different web2 applications, the present invention proposes to integrate 2FA in the blockchain for web3 applications based on smart contracts.

The present invention ensures that the user identity is preserved since it is not stored in the blockchain.

Whereas U.S. Ser. No. 11/025,431B2 uses another wallet to provide 2FA, the present invention uses off-chain data for 2FA; i.e., the data for 2FA come from outside of blockchain. The separation of first authentication key (wallet) and second factor (SMS for instance) improves security because the information goes in separated channels. For instance, if a hacker manages to access the wallet management software (such as Metamask), the two wallets used for authentication in U.S. Ser. No. 11/025,431B2 can be potentially stolen by the hacker. Nonetheless, in the present invention, the hacker needs both to steal the wallet as well as an off-chain data/device, such as the smart-phone. Furthermore, the two on-chain user identities used in U.S. Ser. No. 11/025,431B2, one in sidechain and another in main chain, can be linked. From a point of view of security, this can rebel the target information that a hacker needs to get access. In the present invention, the second factor is never stored in the blockchain and, if phone number is used as 2FA, the off-chain data (phone number) is never visible for the hacker and only the 2FA provider knows the association between first factor (wallet ID) and second factor (phone number). Therefore, the separation and anonymity of the present invention improves the security as well as it protects the user's identity.

The multi-factor authentication is only activated when the end-user asks for it, e.g., by providing a URL (Uniform Resource Locator) which defines an access point to the multi-factor authentication provider. Therefore, end-users can change to another multi-factor authentication provider whenever they want.

BRIEF DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DESCRIPTION OF EMBODIMENTS

Figure 1:
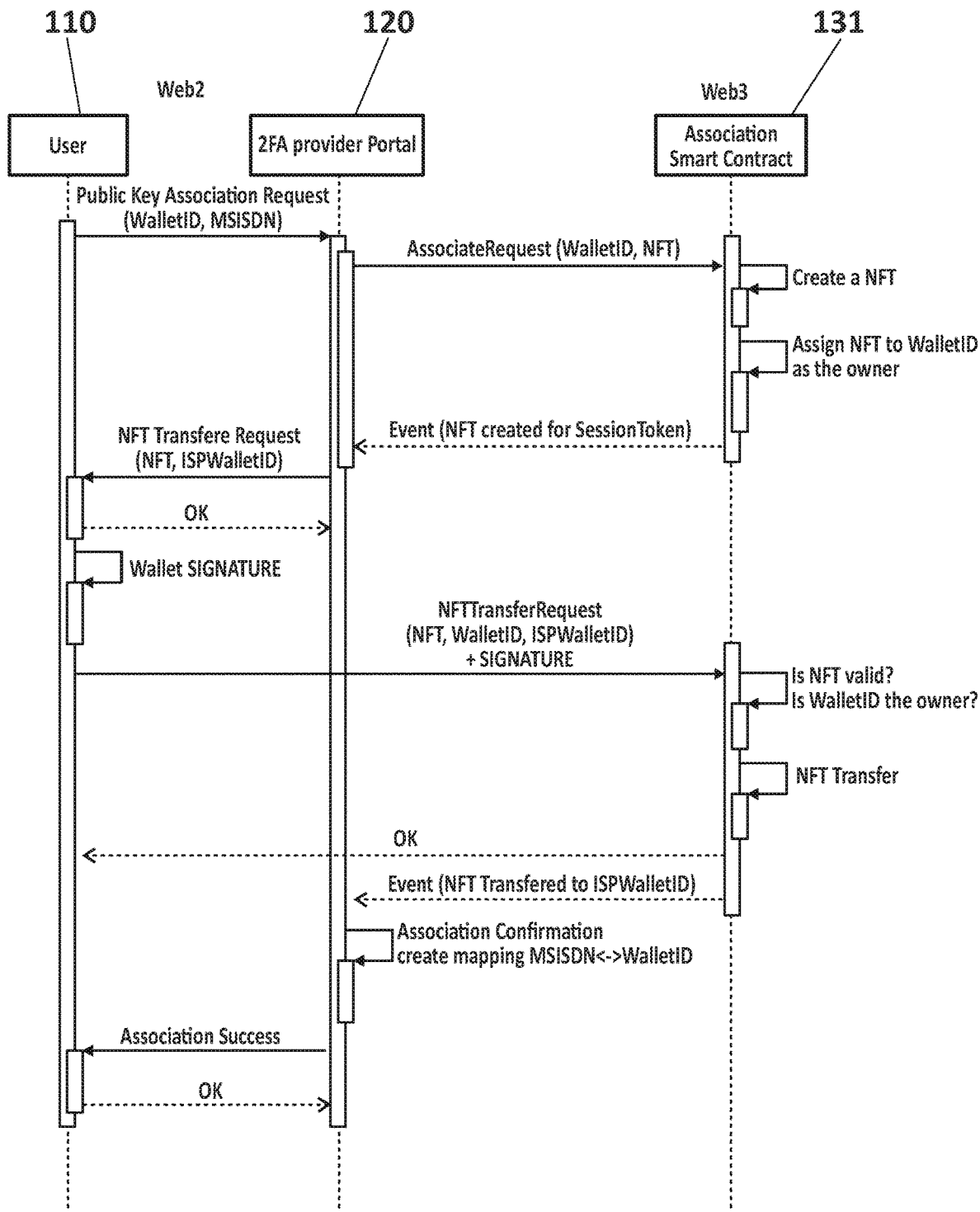
FIG. 1 shows a schematic diagram of a two-factor authentication, 2FA, in blockchain systems, according to a preferred embodiment of the present invention

The present invention may be embodied in other specific systems and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The embodiments of the present invention propose a system to provide multifactor authentication, more particularly, a two-factor authentication, 2FA, in web3 comprising the following entities defined as follows:

Blockchain: a shared, immutable ledger that holds data or state.

Smart contract: a piece of software configured to manipulate or control a blockchain and which runs automatically as predefined conditions are fulfilled.

Operation: A operation in the smart contract is represented by a function. For instance, an operation is to transfer a token from a public key representing the identify of a user in web3 (owner user) to another user (represented by another different public key: destination public key). In such case, the function (operation) needs i) access to the public key of the owner user, ii) the signature that authorizes the transfer (signed by the owner user) and iii) the destination public key.

2FA provider: an oracle service configured to validate the fact that a user knows a piece of information that only said user knows.

2FA provider portal: a web portal through which users can create accounts and associate the accounts with public keys.

2FA SDK (SDK: Software Development Kit): piece of software to be integrated in any smart contract and configured to interact with a 2FA provider by using the following primitives of the 2FA SDK:

2FA provider initialization in a smart contract for a public key.

Asking 2FA for a given public key and call a callback function with a 2FA result.

Writing the 2FA result in the blockchain and call the callback function.

A 2FA provider could be implemented in different ways. For instance, a user may need to install an application in his/her user terminal (e.g., smartphone) configured to ask the user for approval whenever a 2FA is requested. Another example is the utilization of SMS (Short Message Service). In such a case, the 2FA service sends a SMS with a PIN number (Personal Identification Number) to the user's phone and ask the user to introduce the PIN back to a web portal. Since only the user having access to the phone receives the SMS, this provides an extra guarantee about the real identify of the user.

In a preferred embodiment of the present invention, a system to provide 2FA in web3 comprising a 2FA provider using the aforementioned SMS implementation option is described below (but the same design applies to other implementations of the 2FA provider):

1) An end user accesses a 2FA provider portal and creates a new account in the 2FA provider, having the account associated with a phone number. For instance, the 2FA provider portal can send a SMS to the phone number and the user needs to type the received SMS back in the 2FA provider portal to make sure that said user really has access to the associated phone number.
2) The end user is authenticated in the 2FA provider portal by using the phone number.
3) A public key of the user in web3 is used as a first factor of authentication and this public key associates the end-user to the account created in the 2FA provider. This association process can be implemented in different forms: the association between the public key (and so, the user) and the 2FA provider can be implemented to validate that the user really owns the public key; for example, the public key is an identifier of a wallet, WalletID.

Figure 3:
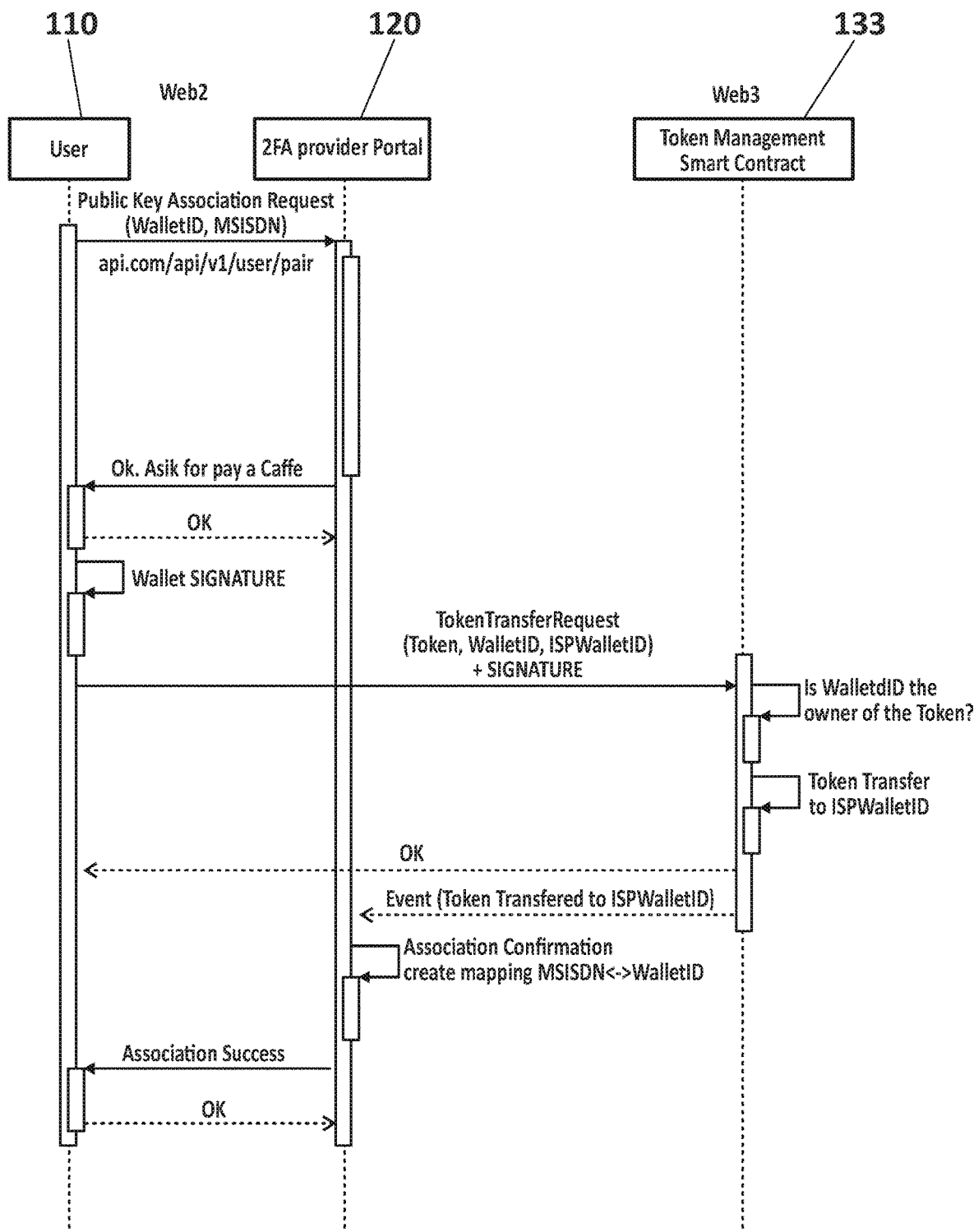
FIG. 3 shows a schematic diagram of a process to associate a wallet identifier with a 2FA provider identity, based on a cryptocurrency transference, according to another possible embodiment of the present invention.

FIGS. 1 and 3 show two different association processes between the wallet identifier WalletID and the identity of the 2FA provider.

In a possible embodiment, the association is based on transference of a NFT as shown in FIG. 1. FIG. 1 shows a sequence diagram of the messages exchanged between the entities involved in the Web2 network, an end-user 110 and a 2FA provider portal 120, and the entity involved in the Web3 network, an association smart contract 131 configured to create an NFT in the blockchain, assign the NFT to the user's wallet and transfer it after validating the NFT is valid and the owner user of the wallet. Once a public key, WalletID in the example of FIG. 1 (and FIG. 3) is introduced in the 2FA provider portal 120, the 2FA provider generates a NFT in the blockchain and assign the public key as the owner of the NFT. The end-user 110 is then asked to transfer the NFT back to 2FA provider and, for this purpose, the end-user 110 needs to access a decentralised application (DAPP), which is an application that can operate autonomously, typically through the use of smart contracts. The DAPP asks the end-user 110 to sign the transfer using the public key, i.e., WalletID. Once the 2FA provider receives the NFT through the 2FA provider portal 120, the public key verification is concluded and the public key is successfully associated to the user's account.

In another possible embodiment, the association is based on a cryptocurrency transference, as shown in FIG. 3, wherein the end-user needs to transfer a small amount of cryptocurrency to the 2FA provider to prove the ownership of the WalletID. FIG. 3 shows a sequence diagram of the messages exchanged between the entities involved in the Web2 network, the end-user 110 and the 2FA provider portal 120, and the entity involved in the Web3 network, a token management smart contract 133 configured to transfer a token (cryptocurrency) from the end-user 110 to the 2FA provider through the portal 120 after the validation process by proving the ownership of the token, i.e., if the owner user of the token is the end-user 110 identified by his/her wallet, WalletID.

Figure 2:
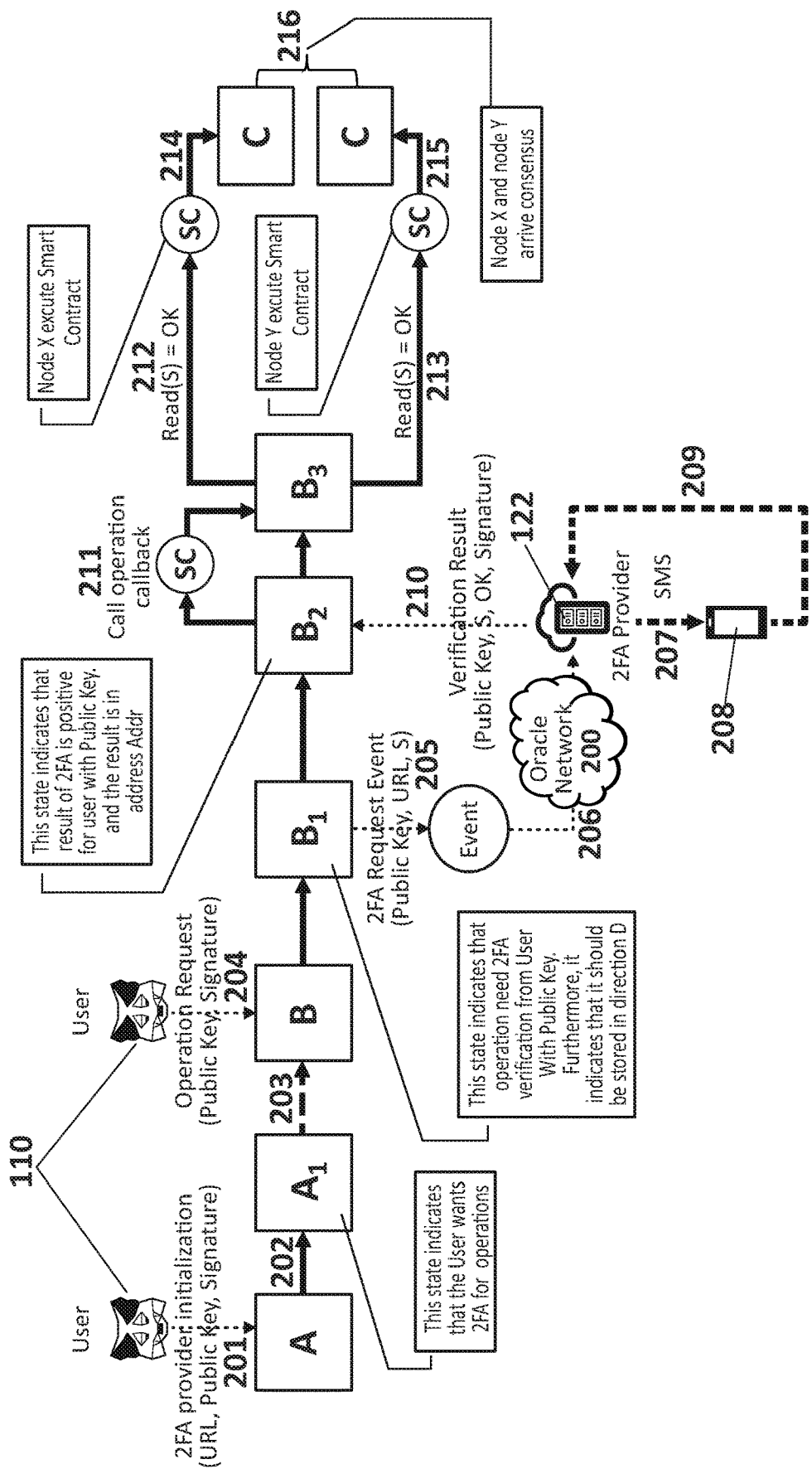
FIG. 2 shows a flow diagram of a process to associate a public key related to a wallet identifier with a phone number, based on a NFT transference, according to a possible embodiment of the present invention.

4) The smart contract needs to integrate a 2FA SDK configured to interact with a SMS-based 2FA provider 122. To perform 2FA in a given operation in the smart contract, the following steps, as shown in FIG. 2, are required:

a. End-user 110 accesses the smart contract to do 2FA provider initialization 201 by calling a function in the smart contract to write a pair composed by an URL and the public key in the blockchain. The URL indicates 202 the 2FA provider 122 that the user 110 wants to use 2FA.

b. The given operation in the smart contract is split into different steps 203 and so the blockchain passes through the states B, $B_1$, $B_2$, $B_3$ defined in the smart contract.

c. When operation is called by sending an operation request 204 from the user 110, a session token S is generated as a random unique number and an event, including the token S and the pair public key-URL, is generated 205 to be propagated 206 to the 2FA Provider 122, indicated by URL, through the oracle network 200.

d. The 2FA oracle network 200 propagates eventually to the 2FA Provider 122 which looks for the user in a database to search a user whose public key matches and, if so, the 2FA Provider 122 sends out an SMS 207 for 2FA with a PIN to the user's phone 208 and asks the user to introduce the PIN back 209 into the 2FA Provider 122. The user must accept the 2FA by, for instance, clicking in a link and introducing the code or PIN arrived in the SMS.

g. Once verification is concluded, the 2FA Provider 122 calls the Verification Result function 210 in the smart contract SC to indicate that 2FA for the session token (S) is a success and also calls the callback function 211 in the smart contract SC.

h. The result of 2FA associated with the session token (S) is read by Node X and Node Y, steps 212 and 213 respectively in FIG. 2, to execute the smart contract SC respectively in steps 214 and 215. If all nodes reach a consensus 216, a new block C is generated, the generated block C representing the result of executing the given operation.

FIG. 2 shows how a blockchain changes during all the process related to the execution of an operation with 2FA, passing through different states or blocks: A, $A_1$, B, $B_1$, $B_2$, $B_3$ and C.

Any existing mechanism can be used as second factor for the 2FA, since the second factor is off-chain data. One option has been described, which is to prove the ownership of a phone number by means of receive a SMS. Another option is to use an application or a hardware-based solution.

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A method for multi-factor authenticating users for Web3 services, the method comprising the following steps:
   creating an account in a multi-factor authentication provider by an end-user accessing the multi-factor authentication provider portal, the multi-factor authentication provider being configured to validate that the end-user owns a public key in a blockchain which identifies the end-user in Web3;
   associating the account in the multi-factor authentication provider with an identifier of a user terminal configured to receive off-chain data used for multi-factor authentication and coming from outside of the blockchain;
   authenticating the end-user in the multi-factor authentication provider portal by using the identifier of the user terminal;
   characterized in that the multi-factor authentication provider validates that the end-user owns the public key by associating the public key used as a first factor of the multi-factor authentication with the multi-factor authentication provider, and the multi-factor authentication provider interacts with a smart contract to perform the multi-factor authentication in an operation in the smart contract by using the off-chain data as one or more factors required, after the first factor, for the multi-factor authentication;
   wherein the multi-factor authentication provider interacts with the smart contract by the following steps:
   the end-user accesses the smart contract to perform initialization of the multi-factor authentication provider by calling a function in the smart contract to write a pair composed by the public key in the blockchain and a uniform resource locator, URL, the URL indicating the multi-factor authentication provider and that the end-user asks for multi-factor authentication;
   sending an operation request from the user to execute the operation in the blockchain, the operation requesting the multi-factor authentication;
   generating a session token by the blockchain and generating an event which includes the generated session token, the public key and the URL;
   propagating the generated event, through an oracle network, from the blockchain to the 2FA two-factor authentication (2FA) Provider located at the URL;
   looking for the end-user by the 2FA Provider in a database to search a user whose public key matches and, if so, the 2FA Provider sends out off-chain data to the user terminal to validate that the end-user owns the public key in the blockchain;
   once validation is concluded, the 2FA Provider calls a verification result function in the smart contract to write a result of the multi-factor authentication associated with the session token and calls a callback function to call the operation in the smart contract; and
   the result of the multi-factor authentication is read by each node executing the smart contract and, when all the nodes reach a consensus, a block is generated in the blockchain, the generated block representing the result of executing the operation.

2. The method according to claim 1, characterized in that the public key is an identifier of a wallet (WalletID).

3. The method according to claim 1, characterized in that associating the public key with the multi-factor authentication provider is based on a cryptocurrency transference.

4. The method according to claim 1, characterized in that associating the public key with the multi-factor authentication provider is based on a Non-Fungible Token transference.

5. A system for multi-factor authenticating users in Web3 services, the system comprising a multi-factor authentication provider, which comprises a hardware processor and a multi-factor authentication provider portal, in which an end-user creates an account by accessing the multi-factor authentication provider portal, the multi-factor authentication provider being configured to:
   validate that the end-user owns a public key in a blockchain which identifies the end-user in Web3;
   associate the created account with an identifier of a user terminal which is configured to receive off-chain data used for the multi-factor authentication and coming from outside of the blockchain;
   authenticate the end-user in the multi-factor authentication provider portal by using the identifier of the user terminal;
   characterized in that the multi-factor authentication provider is further configured to:
   validate that the end-user owns the public key by associating the public key used as a first factor of the multi-factor authentication with the multi-factor authentication provider, and
   interact with a smart contract to perform the multi-factor authentication in an operation in the smart contract by using the off-chain data as one or more factors required, after the first factor, for the multi-factor authentication;
   characterized in that the multi-factor authentication provider is configured to interact with the smart contract by the following steps:
   the end-user accesses the smart contract to perform initialization of the multi-factor authentication provider by calling a function in the smart contract to write a pair composed by the public key in the blockchain and a uniform resource locator, URL, the URL indicating the multi-factor authentication provider and that the end-user asks for the multi-factor authentication;
   sending an operation request from the user to execute the operation in the blockchain, the operation requesting multi-factor authentication;
   generating a session token by the blockchain and generating an event which includes the generated session token, the public key and the URL;
   propagating the generated event, through an oracle network, from the blockchain to the 2FA two-factor authentication (2FA) Provider located at the URL;
   looking for the end-user by the 2FA Provider in a database to search a user whose public key matches and, if so, the 2FA Provider sends out off-chain data to the user terminal to validate that the end-user owns the public key in the blockchain;
   once validation is concluded, the 2FA Provider calls a verification result function in the smart contract to write a result of the multi-factor authentication associated with the session token and calls a callback function to call the operation in the smart contract;
   the result of the multi-factor authentication is read by each node executing the smart contract and, when all the nodes reach a consensus, a block is generated in the blockchain, the generated block representing the result of executing the operation.

6. The system according to claim 5, characterized in that the public key is an identifier of a wallet (WalletID).

7. The system according to claim 5, characterized in that the multi-factor authentication provider is configured to validate that the end-user owns the public key based on a cryptocurrency transference.

8. The system according to claim 5, characterized in that the multi-factor authentication provider is configured to validate that the end-user owns the public key based on a Non-Fungible Token transference.

9. The system according to claim 5, characterized in that the user terminal is a smartphone, a smart speaker, an intelligent assistant, a tablet, a personal computer, a laptop, a TV set or a wearable programmable device.

* * * * *